United States Patent
Ban et al.

(10) Patent No.: US 7,941,185 B2
(45) Date of Patent: May 10, 2011

(54) MOBILE TERMINAL AND DATA DISPLAY METHOD BY INDIVIDUAL SIM CARDS

(75) Inventors: Jung Min Ban, Gumi-si (KR); Won Kyung Seong, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 968 days.

(21) Appl. No.: 11/776,818

(22) Filed: Jul. 12, 2007

(65) Prior Publication Data

US 2008/0102894 A1    May 1, 2008

(30) Foreign Application Priority Data

Oct. 25, 2006  (KR) .................. 10-2006-0103792

(51) Int. Cl.
  *H04M 1/02* (2006.01)
(52) U.S. Cl. ...................... 455/558; 455/411
(58) Field of Classification Search ............... 455/550.1, 455/551, 558, 566, 567, 575.1, 411
See application file for complete search history.

(56) References Cited

U.S. PATENT DOCUMENTS

2002/0185530 A1* 12/2002 Jung et al. .................. 235/382
2006/0084472 A1*  4/2006 Park ............................ 455/558

FOREIGN PATENT DOCUMENTS

| JP | 2002-368871    | 12/2002 |
| KR | 10-2002-0085137 | 11/2002 |
| KR | 10-2005-0081854 | 8/2005  |
| KR | 10-2006-0088125 | 8/2006  |

* cited by examiner

*Primary Examiner* — Thanh C Le
(74) *Attorney, Agent, or Firm* — H.C. Park & Associates, PLC

(57) ABSTRACT

A mobile terminal of displaying data by individual SIM cards and a display method of sorting data according to individual SIM cards includes the steps of authenticating a SIM card that is inserted into the mobile terminal when the power is on by retrieving subscriber information stored in the SIM card and displaying data stored by the authenticated SIM card user in a different form than other data. When a mobile terminal is shared by a plurality of users, data may be displayed in different forms according to the SIM card inserted into the mobile terminal.

22 Claims, 4 Drawing Sheets

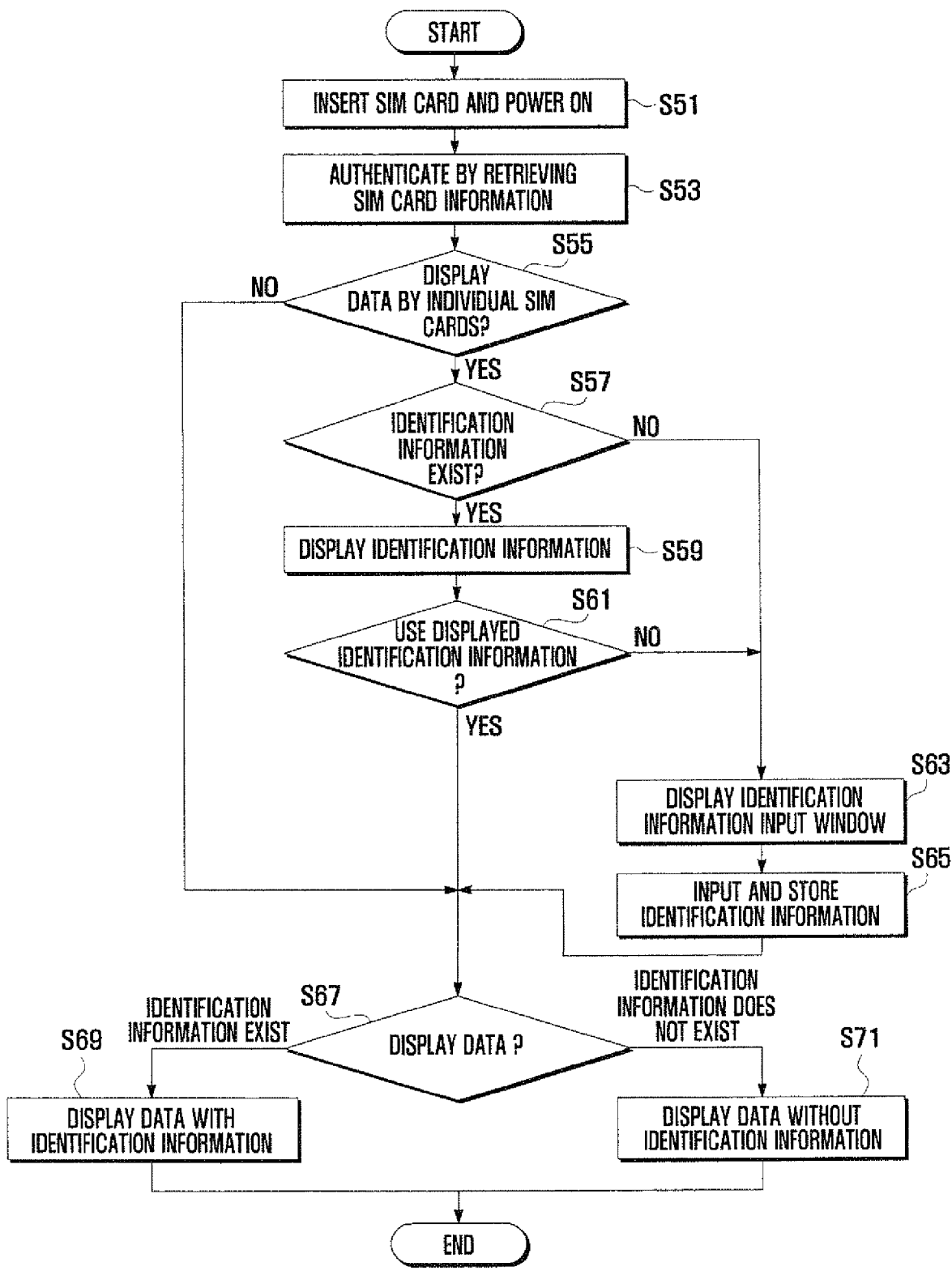

FIG. 3A
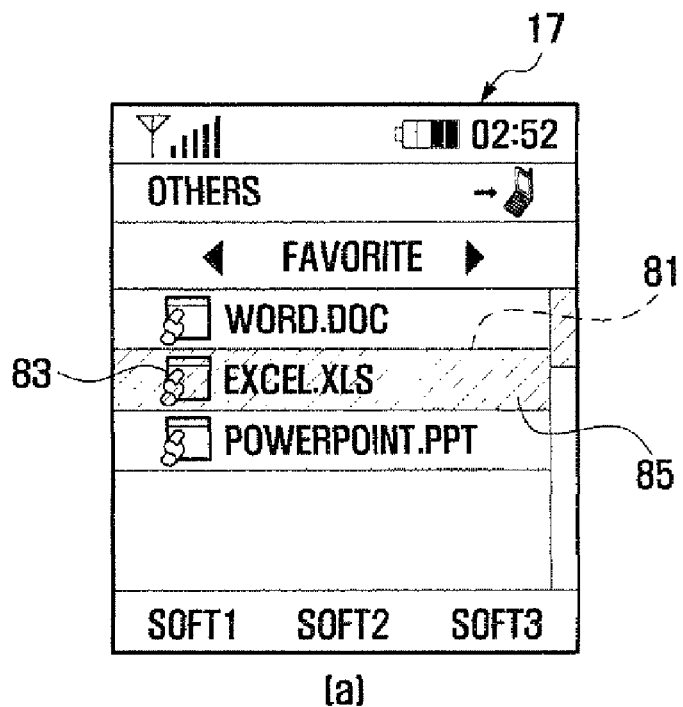
(a)
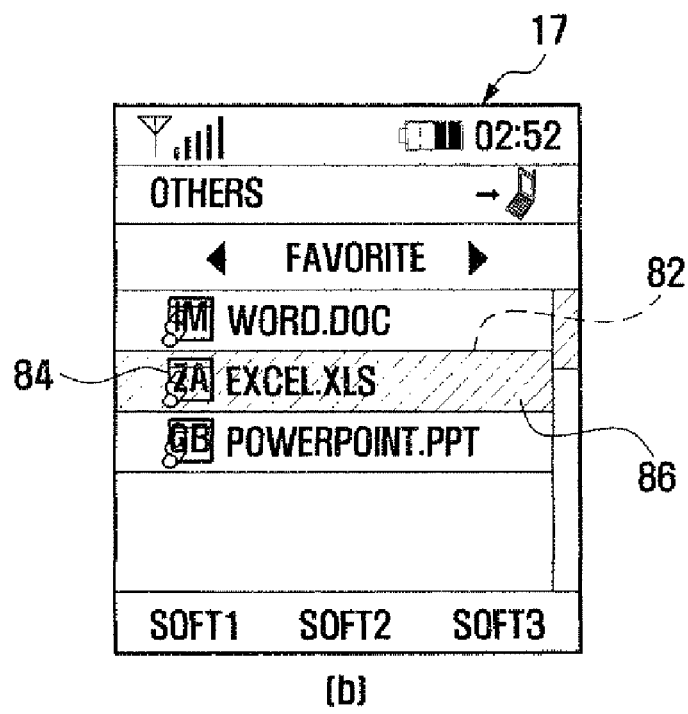
(b)

FIG. 3B
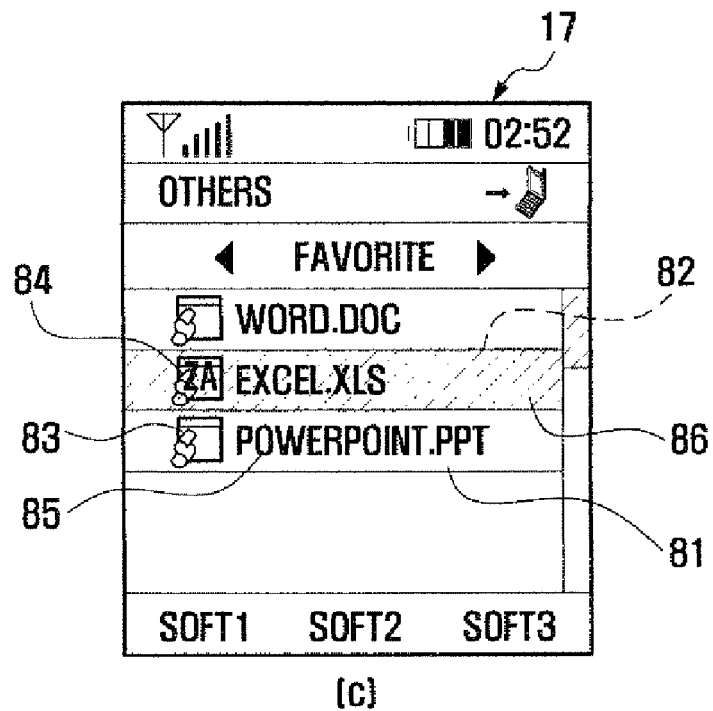
[c]
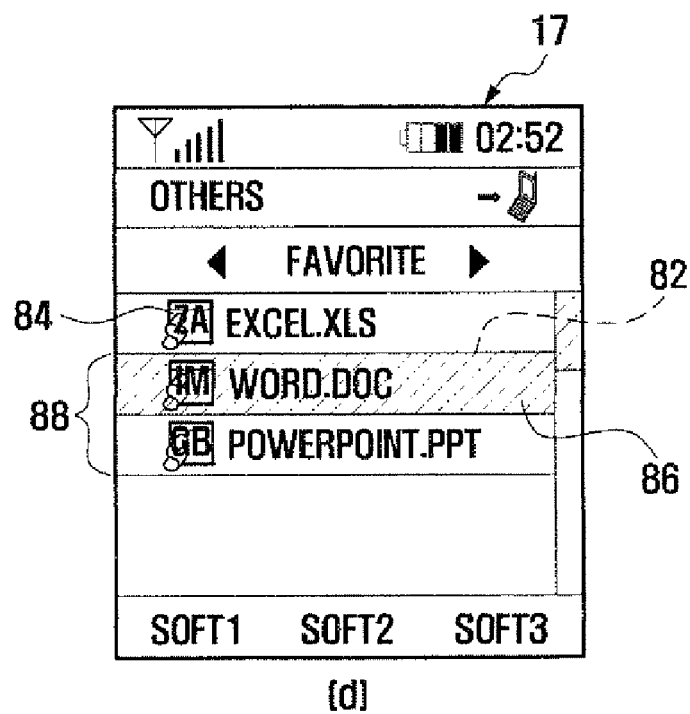
[d]

MOBILE TERMINAL AND DATA DISPLAY METHOD BY INDIVIDUAL SIM CARDS

CROSS REFERENCE TO RELATED APPLICATION

This application claims priority from and the benefit of Korean Patent Application No. 10-2006-0103792, filed on Oct. 25, 2006, which is hereby incorporated by reference for all purposes as if fully set forth herein.

BACKGROUND OF THE INVENTION

1. Field of the Invention

The present invention relates to a mobile terminal and a data display method, and more particularly, to a mobile terminal capable of displaying data stored by individual subscriber identity module (SIM) cards and a display method of sorting data according to individual SIM cards.

2. Discussion of the Background

Generally, a SIM card is used as a subscriber authentication module card in a mobile terminal and stores personal information for various services, such as subscriber authentication, billing, and security functions. The SIM card has been developed to provide free communication in mobile communication systems, such as code division multiple access (CDMA) systems and global systems for mobile communication (GSM). Among the SIM cards, a subscriber authentication module of a universal mobile telecommunication system (UMTS) in the third generation of mobile communication is called a universal subscriber identity module (USIM).

The SIM card may be manufactured in a smart card form, and may be freely inserted into or detached from a mobile terminal. The mobile terminal into which a SIM card is inserted performs authentication in a booting process by retrieving subscriber information stored in the SIM card, and only a user having an authenticated SIM card may use the mobile terminal.

The mobile terminal may be shared by a plurality of users, each having a SIM card. A user may store desired data in a storage unit of the mobile terminal while using the mobile terminal and the data is stored in the storage unit with a file name assigned by the user or with a file name assigned by the control unit of the mobile terminal.

However, in the case of a mobile terminal shared by a plurality of users, data stored by individual users is stored in the storage unit without sorting. Therefore, users may have difficulty in finding desired data if they do not remember the file name of the stored data. In this case, users may need to sort through much data stored in the mobile terminal to find the desired data, and therefore, it may take a long time to find the desired data.

SUMMARY OF THE INVENTION

The present invention provides a method of rapidly searching user data stored in a mobile terminal.

The present invention also provides a method of sorting user data according to individual SIM cards.

The present invention also provides a mobile terminal capable of displaying data stored by individual SIM cards.

Additional features of the invention will be set forth in the description which follows, and in part will be apparent from the description, or may be learned by practice of the invention.

The present invention discloses a method of displaying data according to individual subscriber identity module (SIM) cards for a mobile terminal including authenticating a SIM card in the mobile terminal by retrieving subscriber information stored in the SIM card and displaying stored data corresponding to the authenticated SIM card in a different form than other data.

The present invention also discloses a method of displaying data according to individual subscriber identity module (SIM) cards for a mobile terminal including authenticating a SIM card in the mobile terminal by retrieving subscriber information stored in the SIM card, determining whether data is to be displayed according to individual SIM cards;, and displaying, if data is to be displayed according to individual SIM cards, stored data corresponding to the authenticated SIM card in a different form than other data.

The present invention also discloses a mobile terminal including a display unit to display data, a subscriber identity module (SIM) card having subscriber information, and a control unit to authenticate the SIM card inserted in the mobile terminal by retrieving subscriber information stored in the SIM card and to display stored data corresponding to the authenticated SIM card on the display unit in a different form than other data.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 2 is a flow chart showing a display method of sorting data according to SIM cards according to an exemplary embodiment of the present invention.

FIG. 3A and FIG. 3B are views showing examples of data display screens in the display method of FIG. 2 ([b], [c], and [d]) and data display screens in a conventional method ([a]).

DETAILED DESCRIPTION OF THE ILLUSTRATED EMBODIMENTS

Figure 1:
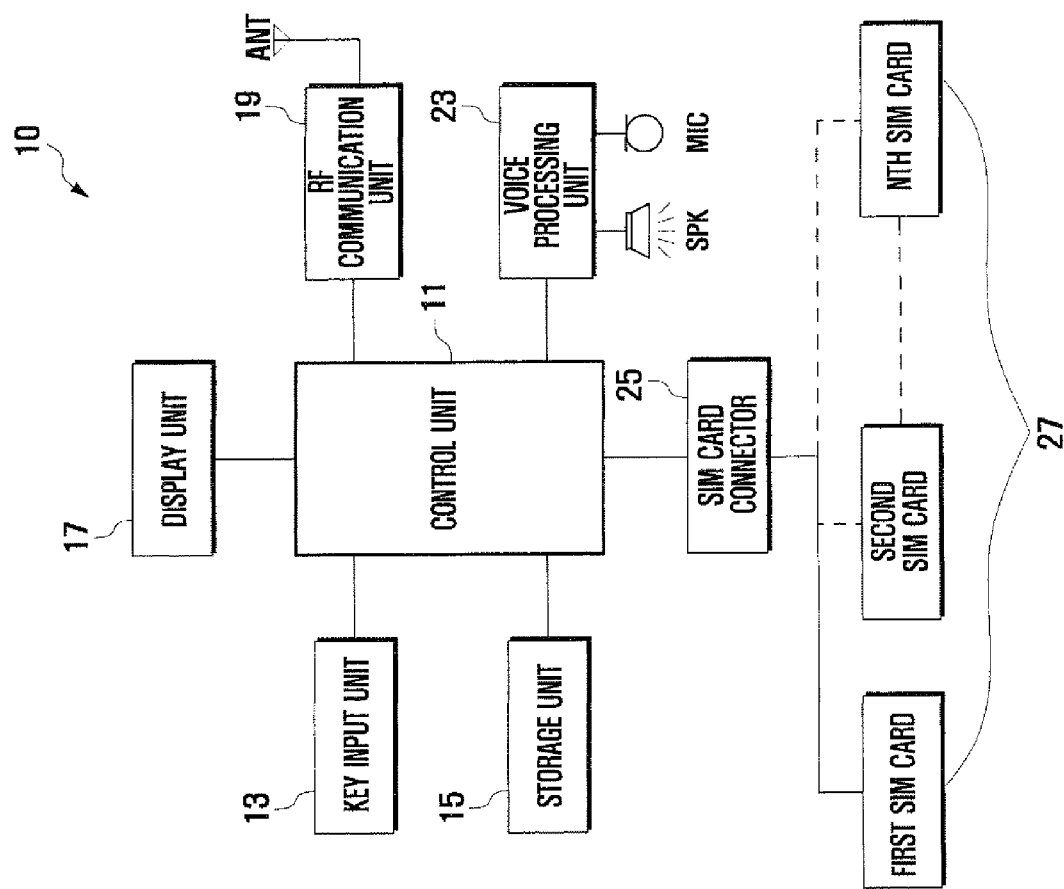
FIG. 1 is a block diagram showing a configuration of a mobile terminal according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Mobile Terminal

FIG. 1 is a block diagram showing a configuration of a mobile terminal 10 according to an exemplary embodiment of the present invention. Referring to FIG. 1, the mobile terminal 10 includes a control unit 11, a key input unit 13, a storage unit 15, a display unit 17, an RF communication unit 19, a voice processing unit 23, a SIM card connector 25, and SIM cards 27.

The control unit 11 controls the general operation of the mobile terminal 10. Particularly, the control unit 11 controls functions related to displaying data according to individual SIM cards.

The key input unit 13 includes a plurality of keys for the operation of the mobile terminal 10, and transmits key data generated by a user's key selection to the control unit 11. A user command generated by the key input unit 13 may execute functions, such as displaying data according to individual SIM cards and inputting and storing identification information.

The storage unit 15 stores programs required for the control of the mobile terminal 10 and data generated by execution of the programs. The storage unit 15 stores data received from the SIM card 27 through the SIM card connector 25, programs for displaying data by individual SIM cards 27, and data generated by execution of the programs. Particularly, the storage unit 15 stores the identification information of the SIM card 27 user. The identification information may be one of a text, icon, audio clip, and image.

The display unit 17 displays various menus of functions executed by the mobile terminal 10 and data stored in the storage unit 15 as images. The display unit 17 displays a pop-up window related to data display from individual SIM cards and a window for inputting identification information. A liquid crystal display (hereinafter LCD) may be used as the display unit 17.

The RF communication unit 19 modulates and converts the frequency of a signal transmitted by the control unit 11, and transmits an RF signal through an antenna ANT. Additionally, the RF communication unit 19 separates an RF signal received through the antenna ANT, demodulates and converts the frequency of the RF signal, and transmits the RF signal to the control unit 11.

The voice processing unit 23 converts a voice signal input through a microphone MIC to a digital signal under the control of the control unit 11. The voice processing unit 23 demodulates the voice signal received through the RF communication unit 19 and outputs the voice signal through a speaker SPK.

The SIM card connector 25 is a socket for inserting or detaching the SIM cards 27, and performs an interfacing function between the SIM cards 27 and the control unit 11.

The SIM card 27 is formed to be inserted into and detached from the SIM card connector 25. The SIM card 27 stores data, such as a subscriber's information required for authentication, a subscriber's telephone number, and a network identification number.

When the mobile terminal starts up with an inserted SIM card 27, the control unit 11 performs authentication by retrieving subscriber information from the SIM card 27. When data is displayed according to individual SIM cards, the control unit 11 displays data stored by the authenticated SIM card 27 user on the display unit 17 in a different form than other data. The control unit 11 displays other data also according to individual SIM cards 27.

The data displayed on the display unit 17 includes a file name and an icon representing the data. The file name of the data includes a text input by a user and a file extension. The control unit 11 controls the mobile terminal to display data stored by the authenticated SIM card 27 user with identification information of the authenticated SIM card 27. The control unit 11 controls the mobile terminal to display the identification information on the data icon. The data stored by the authenticated SIM card 27 user may include a character message, a telephone number, an MP3 file, a telephone list, and other files. The file name may include document files having file extensions such as gul, hwp, doc, and ppt, and image files having file extensions such as if, jpg, and bmp.

Accordingly, the present invention enables users to find desired data rapidly among data displayed on the display unit 17, because the mobile terminal 10 displays data according to individual SIM cards.

Although a mobile communication terminal is disclosed as an example of the mobile terminal, the present invention is not limited thereto. For example, mobile terminals capable of inputting and outputting data through an interface of a SIM card, such as a mobile communication terminal, a PDA (personal digital assistant), a smart phone, an IMT-2000 (International Mobile Telecommunication 2000) terminal, and a UMTS terminal, may be used as the mobile terminal according to an exemplary embodiment of the present invention.

Display Method of Sorting Data by Individual SIM Cards

FIG. 2 is a flow chart showing a display method of sorting data by individual SIM cards according to an exemplary embodiment of the present invention. Referring to FIG. 1 and FIG. 2, the display method of sorting data according to individual SIM cards for a mobile terminal 10 is described below.

Firstly, a SIM card 27 is inserted in the SIM card connector 25 and the mobile terminal is turned on (S51). The control unit 11 performs authentication by retrieving subscriber information from the inserted SIM card 27 (S53). That is, any one of first to Nth SIM cards 27 may be inserted in the SIM card connector 25 (where N is a natural number).

After completing the authentication of the inserted SIM card 27, the control unit 11 controls the mobile terminal to display a pop-up window on the display unit 17, asking whether data is to be displayed according to individual SIM cards (S55). With a key input through the key input unit 13, a user may determine whether data is displayed according to individual SIM cards.

When data is to be displayed according to individual SIM cards, the control unit 11 identifies whether identification information is stored in the authenticated SIM card 27 (S57).

If identification information is stored in the authenticated SIM card 27, the control unit 11 displays the identification information on the display unit 17 (S59) and displays a pop-up window asking whether to use the displayed identification information (S61). If it is determined that the displayed identification information is to be used, the control unit 11 controls the mobile terminal to display the identification information associated with the individual SIM cards when data stored according to individual SIM cards 27 is displayed (S69).

If identification information does not exist at step S57 or if it is determined that the displayed identification information is not to be used in step S61, the control unit 11 controls the mobile terminal to display an identification information input window on the display unit 17 (S63). If the identification information is input by the user through the key input unit 13, the control unit 11 controls the mobile terminal to store the identification information in the storage unit 15 (S65). When identification information does not exist, identification information may be initially input and stored in the storage unit 15. When it is determined that the displayed identification information is not to be used, the identification information stored in the storage unit 15 may be updated.

When the user uses text as identification information, the color of the text may also be selected. That is, the text may be displayed in various colors for easy identification. The text of identification information may include 2 or 3 characters. If the text of identification information has only 1 character, the text may not be sufficient. If the text of identification information has more than 3 characters, the area occupied by the text may become greater than that of the icon.

If it is determined at step S67 that identification information does not exist, the control unit 11 controls the mobile terminal to display data without identification information (S71), when displaying data according to individual SIM cards 27.

FIG. 3A and FIG. 3B are views showing examples of data display screens in the display method of FIG. 2 and data display screens in a conventional method. Referring to FIG. 3A and FIG. 3B, data display screens (a) to (d) are described as follows.

When data display by individual SIM cards is not used as shown in screen (a), data 81 is displayed only with an icon 83 and a file name 85. Here, the icon 83 does not include identification information.

However, when data display according to individual SIM cards is used, the data 82 is displayed according to individual SIM cards, as shown in screen (b). That is, the data 82 may include an icon 84 and a file name 86. The icon 84 may include identification information associated with the data 82. The text 'ZA' is used as the identification information of the data 82 having a file name 86 'Excel.xls'. The text 'JM' is used as the identification information of the data 82 having a file name 'Word.doc'. The text 'GB' is used as the identification information of the data 82 having a file name 'Powerpoint.ppt'. In this example, the text of identification information includes 2 characters that are different colors.

Although an example of displaying the data 82 according to individual SIM cards has been disclosed in screen (b), the present invention is not limited thereto. As shown in screen (c), the data 82 stored by an authenticated SIM card user may be displayed on the display unit 17 in a different form than other data 81. In this case, all data 81 except for the data 82 stored by the authenticated SIM card user may be displayed in a conventional method.

For example, the authenticated SIM card user may use 'ZA' as identification information, and thereby the identification information 'ZA' of the data 82 having the file name 86 'Excel.xls' is displayed with the icon 84. Other data 81 may be displayed according to a conventional method. That is, the data 81 having file names 'Word.doc' and 'Powerpoint.ppt' may be displayed with icons 83 and file names 85, and the icons 83 may not include identification information.

As shown in screen (d), the data 82 stored by the authenticated SIM card user may be displayed prior to data 88 on the display unit 17. That is, the data 82 having the identification information 'ZA' and the file name 86 'Excel.xls' may be displayed prior to other data 88. Although an example of displaying other data 88 with identification information has been disclosed, other data 88 may also be displayed without the identification information.

When displaying a plurality of data on the display unit 17, the control unit 11 may control the mobile terminal to display the same kinds of data in groups. Additionally, the control unit 11 may control the mobile terminal to display data stored by an authenticated SIM card user forehand in the group. For example, data having the same file extension may be displayed in the same group.

According to the present invention, when a mobile terminal is shared by a plurality of users, data stored by individual users may be displayed differently according to a SIM card inserted therein. Therefore, a user may rapidly find desired data among data displayed on a display unit.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of displaying data according to individual subscriber identity module (SIM) cards for a mobile terminal, comprising:
   authenticating a SIM card in the mobile terminal by retrieving subscriber information stored in the SIM card; and
   displaying data stored in the mobile terminal while the authenticated SIM card is inserted in the mobile terminal in a different form than other data stored in the mobile terminal while a different SIM card is inserted in the mobile terminal.

2. The display method of claim 1, wherein the displayed data corresponding to the authenticated SIM card comprises a file name and an icon representing the data.

3. The display method of claim 2, wherein the displayed data comprises identification information of the authenticated SIM card.

4. The display method of claim 3, wherein the identification information is one of a text, an icon, an audio clip, and an image.

5. The display method of claim 4, wherein displaying stored data comprises displaying the identification information on the icon.

6. The display method of claim 1, wherein displaying stored data comprises displaying different data in a sorted form corresponding to individual SIM cards.

7. A method of displaying data according to individual subscriber identity module (SIM) cards for a mobile terminal, comprising:
   authenticating a SIM card in the mobile terminal by retrieving subscriber information stored in the SIM card;
   determining whether data is to be displayed according to individual SIM cards; and
   displaying, if data is to be displayed according to individual SIM cards, data stored in the mobile terminal while the authenticated SIM card is inserted in the mobile terminal in a different form than other data stored in the mobile terminal while a different SIM card is inserted in the mobile terminal.

8. The display method of claim 7, wherein the displayed data comprises a file name and an icon representing the data.

9. The display method of claim 8, wherein displaying stored data comprises displaying the other data according to individual SIM cards.

10. The display method of claim 8, wherein displaying stored data comprises:
   determining whether identification information of the authenticated SIM card exists; and
   displaying, if identification information of the authenticated SIM card exists, stored data corresponding to the authenticated SIM card with the identification information.

11. The display method of claim 10, wherein the identification information is one of a text, an icon, an audio clip, and an image.

12. The display method of claim 11, wherein displaying stored data comprises displaying the identification information on the icon.

13. The display method of claim 10, further comprising:
displaying an identification information input screen if identification information of the authenticated SIM card does not exist; and
storing identification information input using the identification information input screen.

14. The display method of claim 10, further comprising:
determining whether the identification information is to be used if identification information of the authenticated SIM card exists;
displaying, if the identification information is to be used, stored data corresponding to authenticated SIM card with the identification information; and
updating, if the identification information is not to be used, the identification information.

15. The display method of claim 14, wherein updating comprises:
displaying an identification information input screen; and
storing identification information input using the identification information input screen.

16. The display method of claim 7, wherein displaying stored data comprises displaying stored data corresponding to the authenticated SIM card prior to other data.

17. The display method of claim 7, wherein displaying stored data comprises displaying data in groups, wherein stored data corresponding to the authenticated SIM card user is displayed forehand in the group.

18. A mobile terminal, comprising:
a display unit to display data;
a subscriber identity module (SIM) card having subscriber information;
a control unit to authenticate the SIM card inserted in the mobile terminal by retrieving subscriber information stored in the SIM card and to display data stored in the mobile terminal while the authenticated SIM card is inserted in the mobile terminal on the display unit in a different form than other data stored in the mobile terminal while a different SIM card is inserted in the mobile terminal.

19. The mobile terminal of claim 18, wherein the control unit displays stored data corresponding to the authenticated SIM card with identification information of the authenticated SIM card.

20. The mobile terminal of claim 19, wherein the identification information is one of a text, an icon, an audio clip, and an image.

21. The mobile terminal of claim 20, wherein the displayed data comprises a file name and an icon representing the data, and the control unit displays the identification information on the icon.

22. The mobile terminal of claim 18, wherein the control unit displays the other data according to individual SIM cards.

\* \* \* \* \*